United States Patent
Khan et al.

(10) Patent No.: US 11,593,226 B2
(45) Date of Patent: Feb. 28, 2023

(54) SYSTEM AND METHOD FOR ENSURING COMPLIANCE OF PROTECTION POLICY REQUIREMENTS USING VISUAL REPRESENTATION OF BACKUPS

(71) Applicant: EMC IP Holding Company LLC, Hopkinton, MA (US)

(72) Inventors: Asif Khan, Bangalore (IN); Amith Ramachandran, Bangalore (IN); Amarendra Behera, Bangalore (IN); Deepika Nagabushanam, Bengaluru (IN); Ashish Kumar, Bangalore (IN); Pati Mohan, Bangalore (IN); Tushar Dethe, Bangalore (IN); Himanshu Arora, Bangalore (IN); Gururaj Soma, Bangalore (IN); Sapna Chauhan, Bangalore (IN); Soumen Acharya, Bangalore (IN); Reshmee Jawed, Bengaluru (IN); Yasemin Ugur-Ozekinci, Oakville (CA); Shelesh Chopra, Bangalore (IN); Navneet Upadhyay, Ghaziabad (IN); Shraddha Chunekar, Indore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/672,303

(22) Filed: Nov. 1, 2019

(65) Prior Publication Data
US 2021/0133044 A1    May 6, 2021

(51) Int. Cl.
*G06F 11/32* (2006.01)
*G06F 3/0484* (2022.01)
*G06F 12/16* (2006.01)
*G06F 11/14* (2006.01)

(52) U.S. Cl.
CPC ........ *G06F 11/1464* (2013.01); *G06F 3/0484* (2013.01); *G06F 11/1451* (2013.01); *G06F 11/1461* (2013.01); *G06F 11/1469* (2013.01); *G06F 11/324* (2013.01)

(58) Field of Classification Search
None
See application file for complete search history.

(56) References Cited

U.S. PATENT DOCUMENTS

| | | | |
|---|---|---|---|
| 6,745,210 B1 * | 6/2004 | Scanlan | .............. G06F 11/0727 |
| 8,429,359 B1 | 4/2013 | Desai et al. | |
| 8,554,918 B1 | 10/2013 | Douglis | |
| 9,798,629 B1 | 10/2017 | Shilane et al. | |

(Continued)

*Primary Examiner* — Nathan Sadler
(74) *Attorney, Agent, or Firm* — Chamberlain, Hrdlicka, White, Williams & Aughtry (57) ABSTRACT

A backup manager for managing backup services includes persistent storage and a backup analyzer. The persistent storage includes a backup data repository and protection policies. The backup analyzer identifies a new backup stored in backup storage; performs a backup compatibility analysis on the new backup to determine inter-backup compatibility of the identified new backup; updates the backup data repository based on the inter-backup compatibility to obtain an updated backup data repository; and modifies a backup schedule using the updated backup data repository to meet a requirement of a protection policy of the protection policies.

15 Claims, 8 Drawing Sheets

| Example Graphical User Interface 500 | | | | | |
|---|---|---|---|---|---|
| Backup Identifier 510 | Backup Type 520 | Creation Time 530 | Size 540 | Retention Period 550 | Location 560 |
| Backup A 512 | Full 522 | Jun 20, 2019 12:21:36 PM 532 | 4.1 MB 542 | Aug, 1, 2019, 5:30:00 AM 552 | Backup Storage A 562 |
| Backup B 514 | Application Specific Backup 524 | Jun 21, 2019 4:21:36 PM 534 | 1.2 MB 544 | Aug, 1, 2019, 5:30:00 AM 554 | Backup Storage B 564 |
| Backup C 516 | Application Specific Backup 526 | Jun 22, 2019 8:21:36 PM 536 | 1.4 MB 546 | Aug, 1, 2019, 5:30:00 AM 556 | Backup Storage C 566 |
| Backup D 518 | Application Specific Backup 528 | Jun 24, 2019 12:21:36AM 538 | 2.1 MB 548 | Aug, 1, 2019, 5:30:00 AM 558 | Backup Storage D 568 |

(56) References Cited

U.S. PATENT DOCUMENTS

| | | | |
|---|---|---|---|
| 9,977,704 B1 | 5/2018 | Chopra et al. | |
| 10,089,144 B1 | 10/2018 | Nagpal et al. | |
| 10,102,080 B1* | 10/2018 | Gruszka | G06F 11/1464 |
| 10,616,127 B1 | 4/2020 | Suit | |
| 2007/0136541 A1 | 6/2007 | Herz et al. | |
| 2009/0271485 A1 | 10/2009 | Sawyer | |
| 2013/0085995 A1* | 4/2013 | Mostachetti | G06F 11/1458 |
| | | | 707/640 |
| 2013/0339302 A1 | 12/2013 | Zhang et al. | |
| 2014/0279912 A1 | 9/2014 | Anglin | |
| 2014/0279922 A1 | 9/2014 | Kottomtharayil | |
| 2015/0096011 A1 | 4/2015 | Watt | |
| 2016/0217384 A1 | 7/2016 | Leonard et al. | |
| 2016/0342403 A1 | 11/2016 | Zamir | |
| 2017/0010941 A1* | 1/2017 | Shimada | G06F 11/00 |
| 2017/0075765 A1 | 3/2017 | Chen | |
| 2017/0132089 A1* | 5/2017 | Roehrsheim | G06F 11/3006 |
| 2017/0300505 A1 | 10/2017 | Belmanu Sadananda et al. | |
| 2017/0357550 A1 | 12/2017 | Jain | |
| 2017/0364415 A1* | 12/2017 | Formato | G06F 11/1461 |
| 2018/0095816 A1 | 4/2018 | Fang et al. | |
| 2019/0026035 A1 | 1/2019 | Gokhale et al. | |
| 2019/0102094 A1 | 4/2019 | Mutha et al. | |
| 2019/0278661 A1* | 9/2019 | Mehta | G06F 11/1451 |
| 2019/0278663 A1 | 9/2019 | Mehta et al. | |
| 2019/0340081 A1 | 11/2019 | Pradhan et al. | |
| 2020/0019470 A1 | 1/2020 | Wolfson et al. | |
| 2020/0034248 A1 | 1/2020 | Nara et al. | |
| 2020/0034718 A1 | 1/2020 | Beedu et al. | |
| 2020/0192899 A1 | 6/2020 | Joshi | |
| 2020/0264919 A1 | 8/2020 | Vukovic | |
| 2020/0334199 A1 | 10/2020 | Wolfson et al. | |
| 2020/0364112 A1 | 11/2020 | Mehta et al. | |
| 2020/0387321 A1 | 12/2020 | Bansal et al. | |
| 2021/0034571 A1 | 2/2021 | Bedadala et al. | |
| 2021/0133051 A1 | 5/2021 | Kumarasamy et al. | |

* cited by examiner

Example Graphical User Interface 500

| Backup Identifier 510 | Backup Type 520 | Creation Time 530 | Size 540 | Retention Period 550 | Location 560 |
|---|---|---|---|---|---|
| Backup A 512 | Full 522 | Jun 20, 2019 12:21:36 PM 532 | 4.1 MB 542 | Aug, 1, 2019, 5:30:00 AM 552 | Backup Storage A 562 |
| Backup B 514 | Application Specific Backup 524 | Jun 21, 2019 4:21:36 PM 534 | 1.2 MB 544 | Aug, 1, 2019, 5:30:00 AM 554 | Backup Storage B 564 |
| Backup C 516 | Application Specific Backup 526 | Jun 22, 2019 8:21:36 PM 536 | 1.4 MB 546 | Aug, 1, 2019, 5:30:00 AM 556 | Backup Storage C 566 |
| Backup D 518 | Application Specific Backup 528 | Jun 24, 2019 12:21:36AM 538 | 2.1 MB 548 | Aug, 1, 2019, 5:30:00 AM 558 | Backup Storage D 568 |

FIG. 5A

| Example Graphical User Interface 500 | | | | | |
|---|---|---|---|---|---|
| Backup Identifier 510 | Backup Type 520 | Creation Time 530 | Size 540 | Retention Period 550 | Location 560 |
| Backup E 513 | Full 523 | Jun 25, 2019 12:21:36 PM 533 | 4.1 MB 543 | Aug, 1, 2019, 5:30:00 AM 553 | Backup Storage A 563 |
| Backup F 515 | Application Specific Backup 525 | Jun 26, 2019 12:21:36 PM 535 | 1.2 MB 545 | Aug, 1, 2019, 5:30:00 AM 555 | Backup Storage B 565 |
| Backup G 517 | Application Specific Backup 527 | Jun 27, 2019 12:21:36 PM 537 | 1.4 MB 547 | Aug, 1, 2019, 5:30:00 AM 557 | Backup Storage C 567 |
| Backup H 519 | Application Specific Backup 529 | Jun 28, 2019 12:21:36 PM 539 | 2.1 MB 549 | Aug, 1, 2019, 5:30:00 AM 559 | Backup Storage D 569 |

SYSTEM AND METHOD FOR ENSURING COMPLIANCE OF PROTECTION POLICY REQUIREMENTS USING VISUAL REPRESENTATION OF BACKUPS

BACKGROUND

Devices may generate information based on existing information. For example, devices may obtain information and derive information based on the obtained information. To obtain information, devices may be able to communicate with other devices. The communications between the devices may be through any means.

SUMMARY

In one aspect, a backup manager for managing backup services in accordance with one or more embodiments of the invention includes persistent storage and a backup analyzer. The persistent storage includes a backup data repository and protection policies. The backup analyzer identifies a new backup stored in backup storage; performs a backup compatibility analysis on the new backup to determine inter-backup compatibility of the identified new backup; updates the backup data repository based on the inter-backup compatibility to obtain an updated backup data repository; and modifies a backup schedule using the updated backup data repository to meet a requirement of a protection policy of the protection policies.

In one aspect, a method for providing backup services in accordance with one or more embodiments of the invention includes identifying a new backup stored in backup storage; performing a backup compatibility analysis on the new backup to determine inter-backup compatibility of the identified new backup; updating a backup data repository based on the inter-backup compatibility to obtain an updated backup data repository; and modifying a backup schedule using the updated backup data repository to meet a requirement of a protection policy of protection policies.

In one aspect, a non-transitory computer readable medium in accordance with one or more embodiments of the invention includes computer readable program code, which when executed by a computer processor enables the computer processor to perform a method of providing backup services. The method includes identifying a new backup stored in backup storage; performing a backup compatibility analysis on the new backup to determine inter-backup compatibility of the identified new backup; updating a backup data repository based on the inter-backup compatibility to obtain an updated backup data repository; and modifying a backup schedule using the updated backup data repository to meet a requirement of a protection policy of protection policies.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to systems, devices, and methods for reducing the impact of data loss or corruption due to protection policy requirements not being met. Specifically, a system in accordance with one or more embodiments of the invention may monitor backups of a system to identify whether future generated backups are likely to meet the scopes of protection required by protection policies. To enable such determinations to be made, a system in accordance with embodiments of the invention may provide graphical user interfaces that illustrate inter-dependencies between backups that may disguise the scope of protection provided by backups. Consequently, the graphical user interface may enable the true scope of protection provided by backups to be ascertained.

If a current workflow for providing backup and/or restoration services fails to result in the generation of backups that provide a scope of protection that meets the requirements of a protection policy, the system may enable the workflow to be directly modified using the graphical user interface. By doing so, the cognitive burden on users of distributed system may be reduced by enabling complex modifications of workflows to be made without needing to modify data located in multiple locations which is prone to user error.

Figure 1:
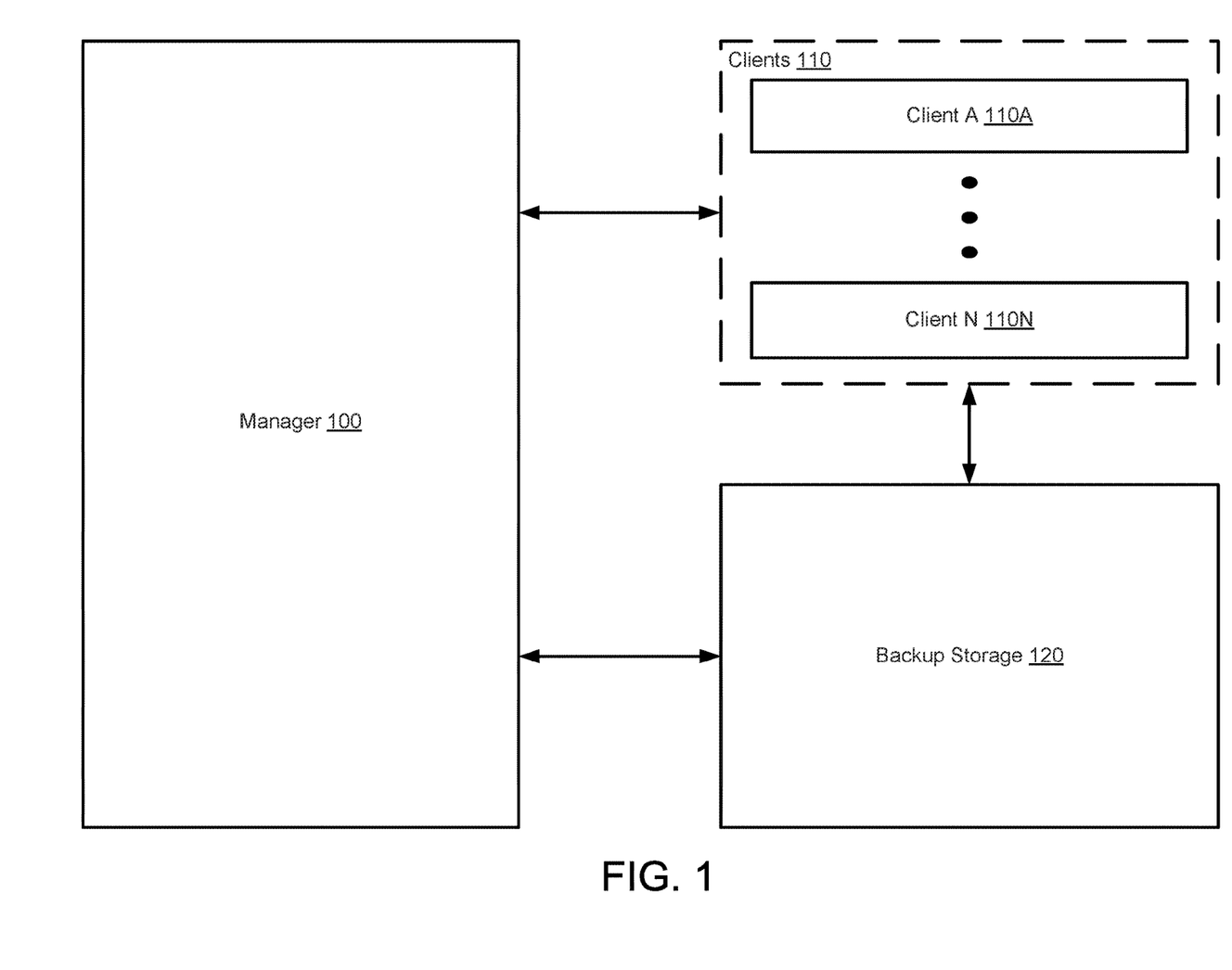
FIG. 1 shows a system in accordance with one or more embodiments of the invention.

FIG. 1 shows a system in accordance with one or more embodiments of the invention. The system may include a manager (100) and clients (110). The system may include any number of clients (110), for example client A (110A) and client N (110N), without departing from the invention. The manager (100) may provide backup and/or restoration services to the clients (110). The backup and/or restoration services may include ensuring that protection policy requirements are being met. The backup and/or restoration services may further include modifying backup generation to meet protection policy requirements.

The system may also include backup storage (120) that may provide data storage services to the clients (110) and/or other entities. The data storage services may include storing of data provided by the clients (110) and providing of previously stored data to the clients (110), the manager (100), and/or other entities. The data stored in backup storage (120) may be used for restoration purposes. The data stored in the backup storage (120) may be used for other purposes without departing from the invention.

When providing backup and/or restoration services, the manager (100) may take into account protection policies. A protection policy may specify one or more requirements that must be met for backup and/or restoration purposes. Depending on how the manager (100) provides backup and/or restoration services, the requirements of the protection policies may not be satisfied.

For example, an administrator or other entity may configure the manner in which the manager (100) provides backup and/or restoration services. In other words, an administrator may define workflows implemented by the manager (100) to provide backup and/or restoration services. If the administrator does not define a workflow that results in the generation and/or storage of backups in a manner that meets the requirements of the protection policies, the system may fail to provide backup and/or restoration services that meet the protection policies.

Embodiments of the invention may provide a method for analyzing whether current workflows implemented by the manager (100) meet the requirements of the protection policies. Specifically, embodiments of the invention may provide a method for analyzing stored backup in backup storage (120), generating a graphical user interface based on the analysis of the stored backups that facilitates determine whether protection policies are met, and modifying the workflows for providing backup and/or restoration services in a manner that result in the provided backup and/or restoration services meeting the requirements of the protection policies.

The components of the system illustrated in FIG. 1 may be operably connected to each other and/or operably connected to other entities (not shown) via any combination of wired and/or wireless networks. Each component of the system illustrated in FIG. 1 is discussed below.

The manager (100) may be implemented using computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions described in this application and/or all, or a portion, of the methods illustrated in FIGS. 4A-4B. The manager (100) may be implemented using other types of computing devices without departing from the invention. For additional details regarding computing devices, refer to FIG. 6.

The manager (100) may be implemented using logical devices without departing from the invention. For example, the manager (100) may include virtual machines that utilize computing resources of any number of physical computing devices to provide the functionality of the manager (100). The manager (100) may be implemented using other types of logical devices without departing from the invention.

In one or more embodiments of the invention, the manager (100) provides backup and/or restoration services to the clients (110). The backup and/or restoration services may include (i) generating and storing backups of the clients (110) in the backup storage (120), (ii) determining whether requirements of protection policies are being met based on backup stored in backup storage (120), (iii) generating of graphical user interfaces to allow a user of the system to determine whether requirements of a protection policy of protection policies are being met, and (iv) modifying of the generation and/or storage of backups in order to meet the requirements of the protection policies to ensure that the requirements are met. The manager (100) may provide other and/or additional services to the clients and/or other entities without departing from the invention. For additional information regarding the manager (100), refer to FIG. 2. For additional information regarding graphical user interfaces, refer to FIG. 3.

The clients (110) may be implemented using computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions described in this application and/or all, or a portion, of the methods illustrated in FIGS. 4A-4B. The clients (110) may be implemented using other types of computing devices without departing from the invention. For additional details regarding computing devices, refer to FIG. 6.

The clients (110) may be implemented using logical devices without departing from the invention. For example, the clients (110) may include virtual machines that utilize computing resources of any number of physical computing devices to provide the functionality of the clients (110). The clients (110) may be implemented using other types of logical devices without departing from the invention.

In one or more embodiments of the invention, the clients (110) provide computer implemented services. A computer implemented service may be, for example, managing a database, serving files, and/or providing other types of services that may be utilized by users. The computing implemented services may be other types of services without departing from the invention.

When providing computer implemented services, the clients (110) may generate and store data which the clients (110) utilize to provide the computer implemented services. For example, to provide database services, the clients (110) may store information from a user in a database. The user may desire access to the information in the future. Consequently, the future availability of the data stored in the database may be valuable to the clients (110).

Similarly, other entities may desire access to all, or a portion, of the data stored in the clients (110) at future points in time. For example, other entities may desire to obtain access to information included in a database hosted by one or more of the clients (110).

To improve the likelihood that such data is available in the future, the clients (110) may utilize backup and/or restoration services provided by the manager (100). As discussed above, the backup and/or restoration services provided by the manager (100) which may include orchestration of backup generation, storage of backups in the backup storage (120), and/or providing access to backups and/or information included in the backups for restoration purposes.

When utilizing the backup and/or restoration services provided by the manager (100), the clients (110) may perform actions under the directions of the manager (100). By doing so, the manager (100) may orchestrate the transmission of data and/or performance of actions between the clients (110), the manager (100), and/or the backup storage (120). For example, a client (e.g., 110A) may send backups to the backup storage (120) under the direction of the manager (100).

In one or more embodiments of the invention, the backup storage (120) is implemented using storage devices. The storage devices may be implemented using physical storage devices and/or logical storage devices. There may be any number of storage devices in the backup storage (120). The backup storage (120) may be implemented using other types of devices that provide data storage services without departing from the invention.

A logical storage device may be an entity that utilizes the physical storage devices of one or more computing devices to provide data storage services. For example, a logical storage may be a virtualized storage that utilizes any quantity of storage resources (e.g., physical storage devices) of any number of computing devices.

A physical storage device may be a physical device that provides data storage services. For example, a physical storage device may include any number of physical devices such as, for example, hard disk drives, solid state drives, tape drives, and/or other types of hardware devices that store data. The physical storage device may include any number of other types of hardware devices for providing data storage services. For example, the physical storage device may include storage controllers that balance and/or allocate storage resources of hardware devices, load balancers that distribute storage workloads across any number of hardware devices, memory for providing cache services for the hardware devices, etc.

In one or more embodiments of the invention, the backup storage (120) provides data storage services to the clients (110) and/or other entities. The data storage services may include storing data and providing of previously stored data to clients (110) and/or other entities. Such provided data may be used for backup and/or restoration (and/or other) purposes by the clients (110) and/or other entities. The backup storage (120) may provide other and/or additional services to other and/or additional entities without departing from the invention.

While the system of FIG. 1 has been described and illustrated as including a limited number of components for the sake of brevity, a system in accordance with embodiments of the invention may include additional, fewer, and/or different components than those illustrated in FIG. 1 without departing from the invention.

Figure 2:
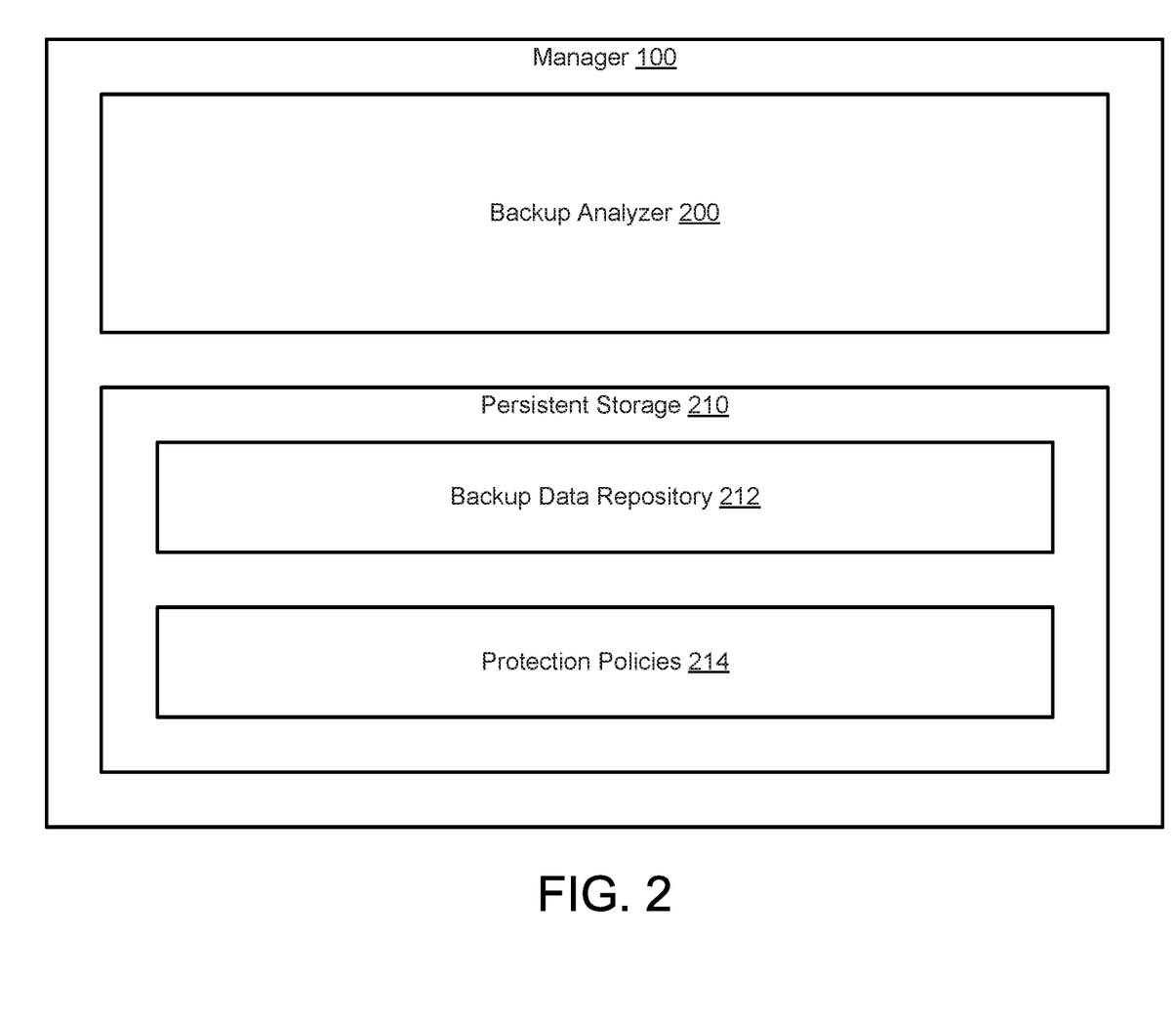
FIG. 2 shows a diagram of a manager in accordance with one or more embodiments of the invention.

As discussed above, the manager (100) may provide backup and/or restoration services to the clients (110, FIG. 1). FIG. 2 shows a diagram of the manager (100) in accordance with one or more embodiments of the invention.

To provide backup services to clients, the manager (100) may perform workflows that cause any number and type of backups to be generated and stored in backup storage. Different types of backups generated for an entity may provide different scopes of protection for the client. For example, full, incremental, and/or application specific backups may be generated for an entity. Any number and type of the aforementioned backups may be generated as defined by a backup workflow.

Due to the different scopes of protection provided by each of the aforementioned backups, it may be difficult to ascertain whether generated backups provide a scope of protection that meets the requirements of a corresponding protection policy. For example, an incremental backup may be dependent on at least one full backup to be usable for restoration purposes. Consequently, if a workflow is configured that only results in generation of incremental backups, no protection may be provided by the generated backups.

A manager (100) in accordance with embodiments of the invention may include functionality to improve the likelihood that the workflows for providing backup services employed by the manager (100) result in the generation of backups that provide scopes of protection that meet the requirements of protection policies that define the scopes of protection to be provided to any number of entities. To provide the aforementioned functionality of the manager (100), the manager (100) may include a backup analyzer (200) and persistent storage (210). Each of these components is discussed below.

The backup analyzer (200) may provide protection policy compliance services. Protection policy compliance services may include (i) analyzing backups stored in backup storage to ascertain whether the workflows employed by the manager (100) for providing backup and/or restoration services meet the requirements of the protection policies (214), (ii) generating graphical user interfaces based on the analysis, (iii) obtaining information from users using the graphical user interfaces, and/or (iv) modifying the workflows for providing backup and/or restoration services based on the information from the users.

To provide its services, the backup analyzer (200) may maintain a backup data repository (212) that stores information regarding previously generated backups. The contents of the backup data repository (212) is discussed below.

The backup analyzer (200) may be implemented using a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the backup analyzer (200) described throughout this application and/or all or a portion of the methods illustrated in FIGS. 4A-4B. The backup analyzer (200) may be another type of physical device without departing from the invention.

Figure 4A:
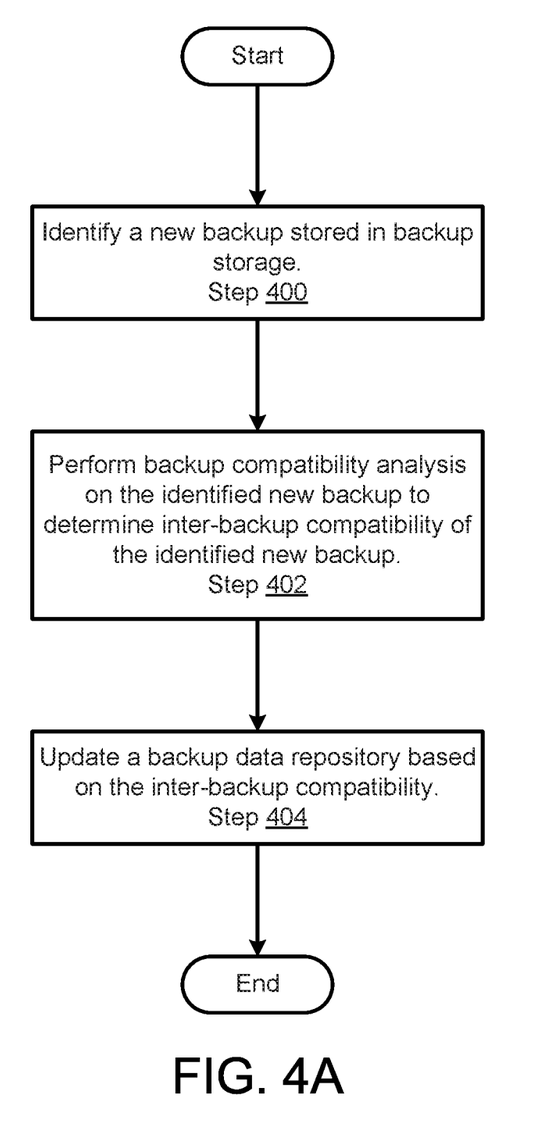
FIG. 4A shows a flowchart of a method in accordance with one or more embodiments of the invention.
Figure 4B:
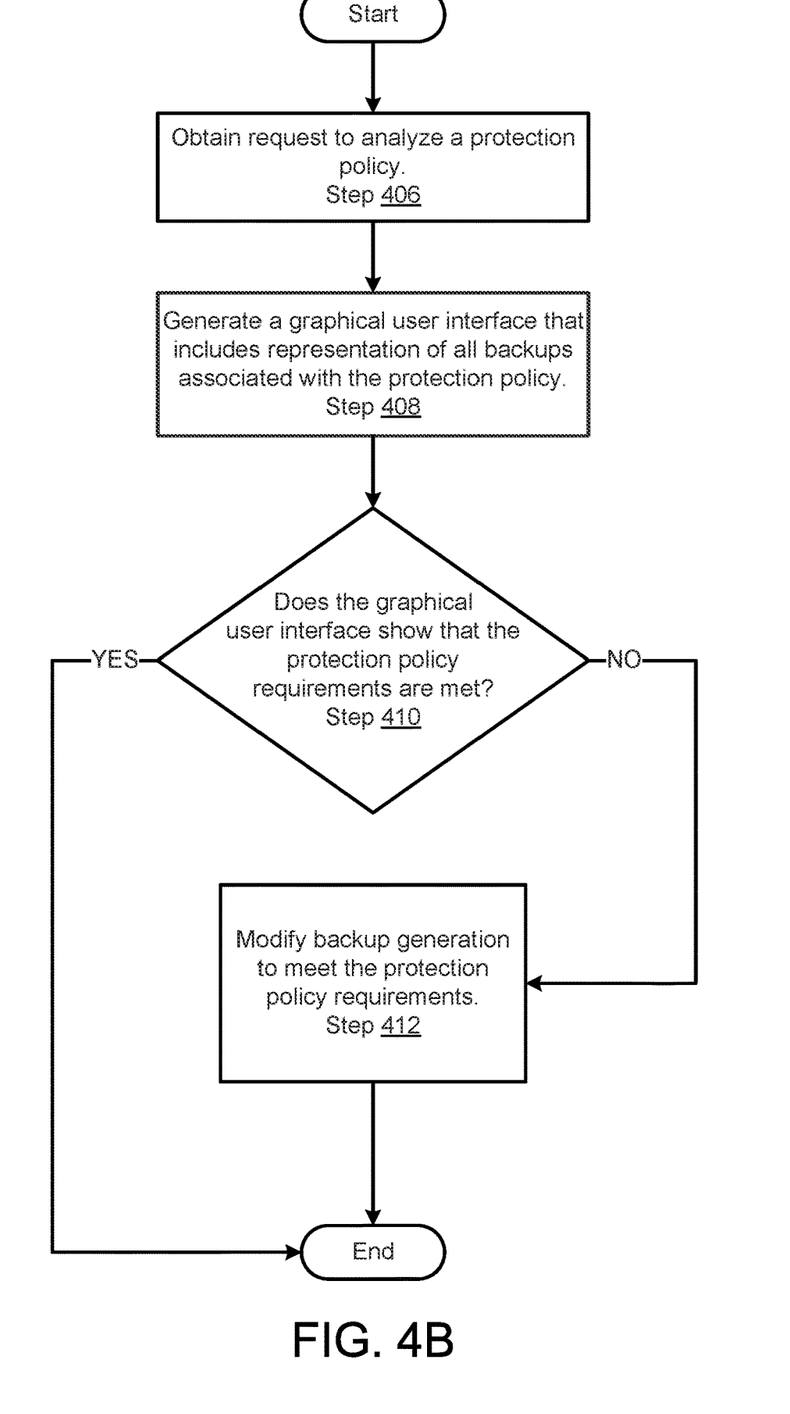
FIG. 4B shows a flowchart of a method in accordance with one or more embodiments of the invention.

The backup analyzer (200) may be implemented using computer instructions (e.g., computing code) stored on a persistent storage (e.g., 210) that when executed by a processor of the manager (100) causes the manager (100) to perform the functionality of the backup analyzer (200) described throughout this application and/or all or a portion of the methods illustrated in FIGS. 4A-4B.

The backup analyzer (200) may utilize data structures stored in a persistent storage (210) of the manager (100). The persistent storages may provide data storage services. The data storage services may include storing of data and providing of previously stored data. The persistent storage (210) may provide other and/or additional services without departing from the invention.

The persistent storages may be implemented using one or more physical storage devices and/or logical storage devices.

A physical storage device may include any combination of hard disk drives, solid state disk drives, tape drives, and/or any other physical storage mediums for the storage of data. The persistent storage (210) may include other types of physical storage devices without departing from the invention.

A logical storage device (e.g., virtualized storage) may utilize any quantity of hardware storage resources of any number of computing devices to provide data storage services. For example, the persistent storage (210) may utilize portions of any combination of hard disk drives, solid state disk drives, tape drives, and/or any other physical storage medium of any number of computing devices. The persistent storage (210) may include other types of logical storage devices without departing from the invention.

As discussed above, the persistent storage (210) may store data structures utilized by the backup analyzer (200) and/or other entities. The data structures stored in persistent storage (210) may include a backup data repository (212) and protection policies (214). Each of these data structures is discussed below. The persistent storage (210) may store other and/or addition data structures without departing from the invention.

The backup data repository (212) may include data structures that include information regarding backups generated by the clients (110, FIG. 1) and/or stored in backup storages (120, FIG. 1). The information included in the backup data repository (212) regarding the backups may include backup identifiers, backup types, creation times, backup sizes, retention periods, and/or storage locations. Each of these types of information is discussed below. The backup data repository (212) may include other and/or additional information pertaining to backups stored in backup storages (120, FIG. 1) without departing from the invention.

Backup identifiers may be used by the backup analyzer to differentiate the backups stored in backup storages (120, FIG. 1). The backup identifiers may be reference numbers or another identifier that differentiates backups in backup storages (120, FIG. 1) without departing from the invention.

Backup types may include information that specifies the type of backup a backup stored in the backup storages (120, FIG. 1) is. Backups stored in the backup storages (120, FIG. 1) may be, for example, full backups, differential backups, incremental backups, or application specific backups. Backups stored in backup storages (120, FIG. 1) may be any type of backup without departing from the invention.

Creation times may include information that specifies the time in which a backup stored in the backup storages (120, FIG. 1) was generated. The creation time may include the second, minute, hour, day, month, and/or year that a backup stored in the backup storages (120, FIG. 1) was generated. The creation time may include other references of time that may be used to discern when a backup of the backup storages (120, FIG. 1) was created without departing from the invention.

Backup sizes may include information that specifies the size of a backup stored in the backup storages. For example, the backup sizes may specify the size of a backup in megabytes, gigabytes, or any other unit of storage size. The backup sizes may include other and/or additional information regarding the size of backups stored in backup storages (120, FIG. 1) without departing from the invention.

The retention period may include information that specifies the amount of time backups stored in the backup storages (120, FIG. 1) must remain stored before the backups can be overwritten, edited, and/or deleted from the backup storages (120, FIG. 1). The retention period may include the second, minute, hour, day, month, and/or year when a backup may be overwritten, edited, and/or deleted. The retention period may include other and/or additional information pertaining to the retention period of backups without departing from the invention.

The storage location may include information that specifies the storage location of a backup stored in backup storages (120, FIG. 1). The backup storages (120, FIG. 1) may include any number of storage devices. The storage location may specify the storage device that a backup is stored in. The storage location may be, for example, a storage device reference number that specifies the storage device a backup is stored in. The storage location may include other and/or additional information pertaining to the storage location of backups stored in the backup storages (120, FIG. 1) without departing from the invention.

The information stored in the backup data repository (212) may be maintained and updated by the backup analyzer (200) and/or other entities. The backup analyzer (200) may also utilize the information in the backup data repository (212) to generate graphical user interfaces. For additional information regarding graphical user interfaces, refer to FIG. 3.

Protection policies (214) may be data structures that include various requirements for storing backups for client applications. The requirements may define the scope of protection to be provided to one or more entities (e.g., clients).

For example, the protection policies may specify the location, type, and a schedule for backups to be generated for entities. There may be any number of protection policies (214) stored in the persistent storage (210). There may be any quantity of requirements associated with a protection policy of protection policies (214). The protection policies (214) may be utilized by the backup analyzer (200) to determine whether the requirements of the protection policies (214) are being met and/or determine how to modify workflows for providing backup and/or restoration services to ensure that the scopes of protection provided by backups meet the scope of protection specified by the protection policies (214).

As discussed above, the manager (100) may produce a graphical user interface to allow the user of a system to visualize backup generated by the system and/or protection policies. A graphical user interface may be an interface that allows users to interface with a device through graphical icons and/or other types of sensory stimuli (e.g., sounds). For example, a graphical user interface may be a data structure that defines the arrangement, color, and/or other characteristics of portions of a display. A graphical user interface may also be interactive in that it enables users to provide input (e.g., input information via mouse clicks) with respect to different portions of the display.

Figure 3:
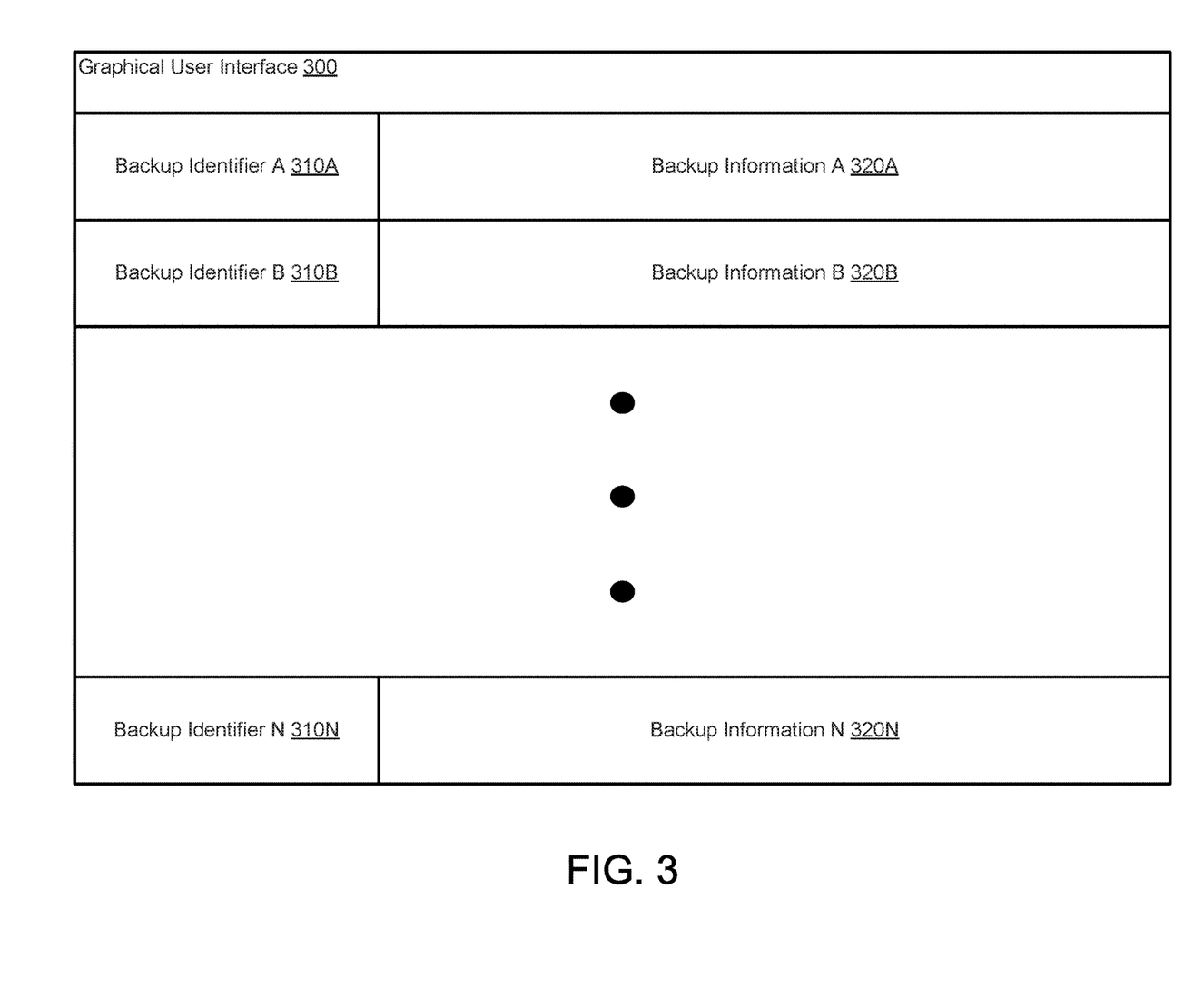
FIG. 3 shows a diagram of a graphical user interface in accordance with one or more embodiments of the invention.

FIG. 3 shows a diagram of a graphical user interface (300) in accordance with one or more embodiments of the invention. The graphical user interface (300) may provide a visual representation of backups associated with particular protection policies.

The graphical user interface (300) may include data that when rendered on a display separates the display into a number of regions. The regions may, for example, divide the display into a row and column structure. Each of the rows may include information regarding a particular backup. For example, each row may include a corresponding backup identifier (e.g., 310A, 310B, and 310N) and backup information (e.g., 320A, 320B, 320N) corresponding to the backup identified by the backup identifier in the row. The graphical user interface (300) may include other and/or additional information or components without departing from the invention.

The backup identifiers (e.g., 310A, 310B, and 310N) may specify the backups associated with each respective row. For example, the backup identifiers may be names of the backups. The backup identifiers may be displayed as text disposed at the beginning of each of the rows.

The backup information (e.g., 320A, 320B, 320N) disposed in each row may include information regarding the backup specified by the backup identifier of the respective row. The backup information (e.g., 320A, 320B, 320N) may include all, or a portion, of the information regarding the backup specified by the backup identifier of the row. For example, the backup information (e.g., 320A, 320B, 320N) may specify backup types, creation times, backup sizes, retention periods, and/or storage locations of backups. The backup information of each row may be rendered as text, icons, or other types of patterns that may be used to indicate the information of each portion of backup information.

The graphical user interface (300) may be generated by the backup analyzer (200, FIG. 2) of the manager (100, FIG. 1). The graphical user interface (300) may implement any visual layout and/or design without departing from the invention.

The graphical user interface (300) may include user interaction capabilities without departing from the invention. For example, a user of the system may use an input device such as a mouse, keyboard, touch screen, etc., to interact with the elements of the graphical user interface (300). User interactions may include scrolling, selecting buttons or icons, and/or other user interactions without departing from the invention. The graphical user interface (300) may enable users to alter a workflow for providing backup services to meet protection policy requirements.

For example, as discussed above, the backup information displayed in each row may include a retention time (e.g., how long a backup is to be stored in backup storage before deletion) for the backup. If the retention time for the backup does not meet protection policies, a user may, for example, select the retention time and modify the retention time by inputting using a keyboard a new value. When input, the backup analyzer may utilize the input to modify a workflow for providing backup services based on the input. By doing so, future backups generated in accordance with the workflow that resulted in the generation of the backup that was interacted with by the user may be generated in a manner that results in the input retention time defining retention time for the future backups.

As discussed above, a manager in accordance with one or more embodiments of the invention may maintain a backup data repository that includes information regarding backups stored in backup storages that may be used to generate a graphical user interface that provides visual representations of backups associated with protection policies. The manager may alter backup generation based on indications from generated graphical user interfaces that protection policy requirements are not being met. FIGS. 4A-4B show methods that may be performed by the manager when providing the aforementioned functionality.

FIG. 4A shows a flowchart of a method in accordance with one or more embodiments of the invention. The method depicted in FIG. 4A may be used to maintain a backup data repository. The method depicted in FIG. 4A may be performed by, for example, the manager (100, FIG. 1). Other components of the system illustrated in FIG. 1 may perform all, or a portion, of the method of FIG. 4A without departing from the invention.

While FIG. 4A is illustrated as a series of steps, any of the steps may be omitted, performed in a different order, additional steps may be included, and/or any or all of the steps may be performed in a parallel and/or partially overlapping manner without departing from the invention.

In step 400, a new backup stored in backup storages is identified.

The manager may monitor the backup storages. The manager may be notified when and where backups are stored in backup storages. When a backup is stored in backup storages, the manager may access the backup and identify it as a newly stored backup. A new backup stored in backup storages may be identified via other and/or additional methods without departing from the invention.

A client, or an entity hosted by a client, may send a message to the manager notifying the manager that a new backup has been stored in the backup storages. The manager may access the backup storages and search for a backup with an unrecognized backup identifier. When the manager locates a backup with an unrecognized backup identifier, the manager may identify the corresponding backup as a new backup. A new backup stored in backup storages may be identified via other and/or additional methods without departing from the invention.

The message from the client to the manager that notifies the manager of a new backup stored in backup storages may include a backup identifier. The manager may access the backup storages and utilize the backup identifier to identify the newly stored backup. The manager may check the backup identifier of all the backups stored in backup storages until the manager finds a backup with a backup identifier that corresponds with the backup identifier included in the message from the client. When the manager locates a backup with the backup identifier included in the message, the manager may identify the corresponding backup as a new backup. A new backup stored in backup storages may be identified via other and/or additional methods without departing from the invention.

The message from the client to the manager that notifies the manager of a new backup stored in backup storages may include the storage location of the newly stored backup. The storage location may specify the storage device of the backup storages that the new backup was stored in. The storage location may further specify the location of the new backup in the particular storage device. The manager may access this storage device and identify the backup stored in the specified location of the specified storage device as a new backup. A new backup stored in backup storages may be identified via other and/or additional methods without departing from the invention.

In step 402, backup compatibility analysis is performed on the identified backup to determine inter-backup compatibility of the identified new backup.

After identifying the new backup, the manager may perform backup compatibility analysis on the newly identified backup. The backup compatibility analysis may include analyzing the backup contents, backup storage location, and/or other aspects of the newly identified backup. The backup analyzer of the manager may analyze the newly identified backup to determine inter-backup compatibility of the backup. Inter-backup compatibility may include information pertaining to the identified new backup. For example, the backup compatibility analysis may result in inter-backup compatibility including backup information pertaining to the backup type, creation date, backup size, retention period, and storage location of the newly identified backup. The backup compatibility analysis may result in the generation of other and/or additional backup information included in the inter-backup compatibility without departing from the invention.

In one or more embodiments of the invention, backup compatibility analysis is performed on the identified backup to determine inter-backup compatibility of the identified new backup via the method of step 402. Other and/or additional methods may be used to perform backup compatibility analysis on the identified new backup to determine inter-backup compatibility of the identified new backup without departing from the invention.

In step 404, a backup data repository is updated based on the inter-backup compatibility.

As discussed above, the inter-backup compatibility of the identified new backup determined through inter-backup compatibility analysis may include backup information pertaining the identified new backup. The manager may update the backup data repository to include the backup information obtained from the inter-backup compatibility analysis. Updating the backup data repository may include the backup analyzer of the manager writing backup information included in the inter-backup compatibility into the storage device of the persistent storage of the manager that stores the backup data repository. A backup data repository may be updated based on the inter-backup compatibility via other and/or additional methods without departing from the invention.

The method may end following step 404.

In one or more embodiments of the invention, a backup data repository is maintained via the method illustrated in FIG. 4A. Other and/or additional methods may be used to maintain a backup data repository without departing from the invention.

As discussed above, the manager may analyze protection policies to determine whether the requirements of said protection policies are being met. FIG. 4B shows a flowchart of a method in accordance with one or more embodiments of the invention. The method depicted in FIG. 4B may be used to analyze a protection policy. The method in FIG. 4B may be performed by, for example, the manager (100, FIG. 1). Other components of the system illustrated in FIG. 1 may perform all, or a portion, of the method of FIG. 4B without departing from the invention.

While FIG. 4B is illustrated as a series of steps, any of the steps may be omitted, performed in a different order, additional steps may be included, and/or any or all of the steps may be performed in a parallel and/or partially overlapping manner without departing from the invention.

In step 406, a request to analyze a protection policy is obtained.

The manager may be requested to analyze protection policies to ensure that the all of the requirements of the protection policies are being met. The client, an entity hosted by the client, or a user of the system may send a message to the manager that include requests to analyze protection policies. The manager may be requested to periodically analyze all of the protection policies associated with a client of clients. A request to analyze a protection policy may be obtained via other and/or additional methods without departing from the invention.

In step 408, a graphical user interface is generated that includes representation of all backups associated with the protection policy.

In response to a request to analyze a protection policy, the manager may utilize the backup data repository to generate a graphical user interface. The manager may identify all of the backups associated with the protection policy that is to be analyzed. The manager may then use all, or a portion of, the backup information associated with each backup associated with the protection policy included in the backup data repository to populate a graphical user interface that provides visual representation of all backups associated with the protection policy. A graphical user interface may be generated that includes representation of all backups associated with the protection policy via other and/or additional methods without departing from the invention.

In step 410, it is determined whether the graphical user interface shows that the protection policy requirements are met.

As discussed above, the graphical user interface may represent all of the backups associated with a protection policy and includes relevant information pertaining to the backups. The information included in the graphical user interface may indicate whether the requirements of the protection policy are being met.

If the information included in the graphical user interface indicates that the protection policy requirements are being met, it may be determined the protection policy requirements are being met. If the information included in the graphical user interface does not indicate that the protection policy requirements are being met, it may be determined the protection policy requirements are not being met.

The backup analyzer may make the aforementioned observations of the information included in the graphical user interface and determine automatically whether the requirements of the protection policy are being met.

A user of the system may make the aforementioned observation of the information included in the graphical user interface and may manually determine whether the requirements of the protection policy are being met.

For example, a protection policy may require that after a full backup must have a retention period of three months from the creation date. After obtaining a request to analyze this protection policy, a graphical user interface may be generated that includes all of the backups that are full backups. The graphical user interface may also include the creation date and retention period of all of the backups. The graphical user interface may show that the retention periods are three months after the creation dates for all backups represented in the graphical user interface. Therefore, it may be determined that the graphical user interface indicates the protection policy requirements are being met. The graphical user interface may show that not all of the retention periods are three months after the creation dates for all backups represented in the graphical user interface. Therefore, it may be determined that the graphical user interface indicates the protection policy requirements are not being met.

It may be determined whether the graphical user interface shows that the protection policy requirements are met via the method of step 410. It may be determined whether the graphical user interface shows that the protection policy requirements are met via other and/or additional methods without departing from the invention.

If it is determined the graphical user interface shows the protection policy requirements are met, the method may end following step 410. If it is determined the graphical user interface shows the protection policy requirements are not met, the method may proceed to step 412.

In step 412, backup generation is modified to meet the protection policy requirements.

As discussed above, if the protection policy requirements are not being met, the workflow for providing backup services may be modified to meet the protection policy requirements. The manager may send a message to the client, or an entity hosted by the client, requesting modification of the backup generation associated with the protection policy. The message may include modifications to be made to the backup generation to meet protection policy requirements. The modification of the backup generation may result in the generation of future backups which meet the protection policy requirements. The backup generation may be modified to meet protection policy requirements via other and/or additional methods without departing from the invention.

The method may end following step 412.

In one or more embodiments of the invention, a protection policy is analyzed via the method depicted in FIG. 4B. Other and/or additional methods may be used to analyze a protection policy without departing from the invention.

Figure 5A:
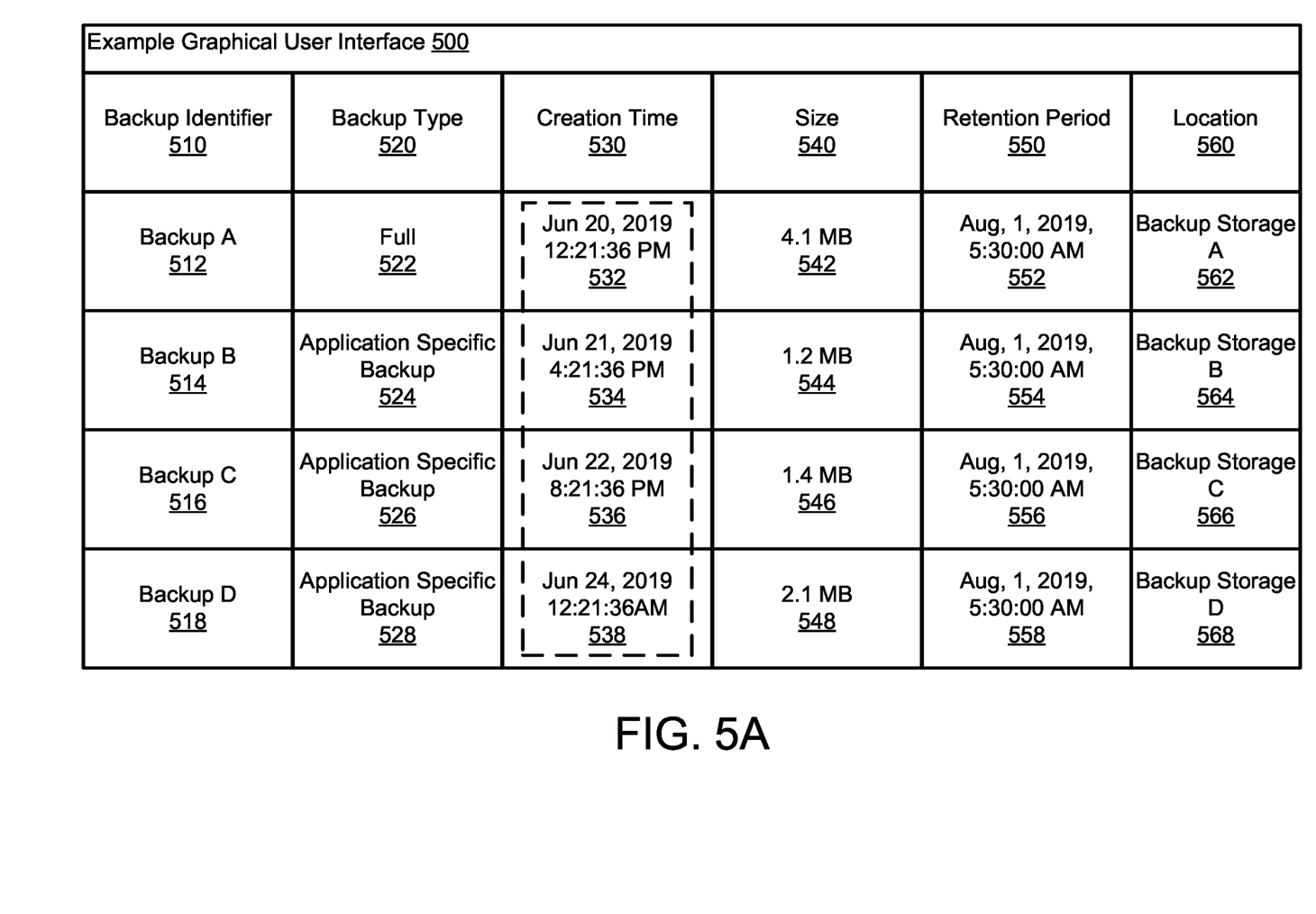
FIGS. 5A-5B show an example in accordance with one or more embodiments of the invention.
Figure 5B:
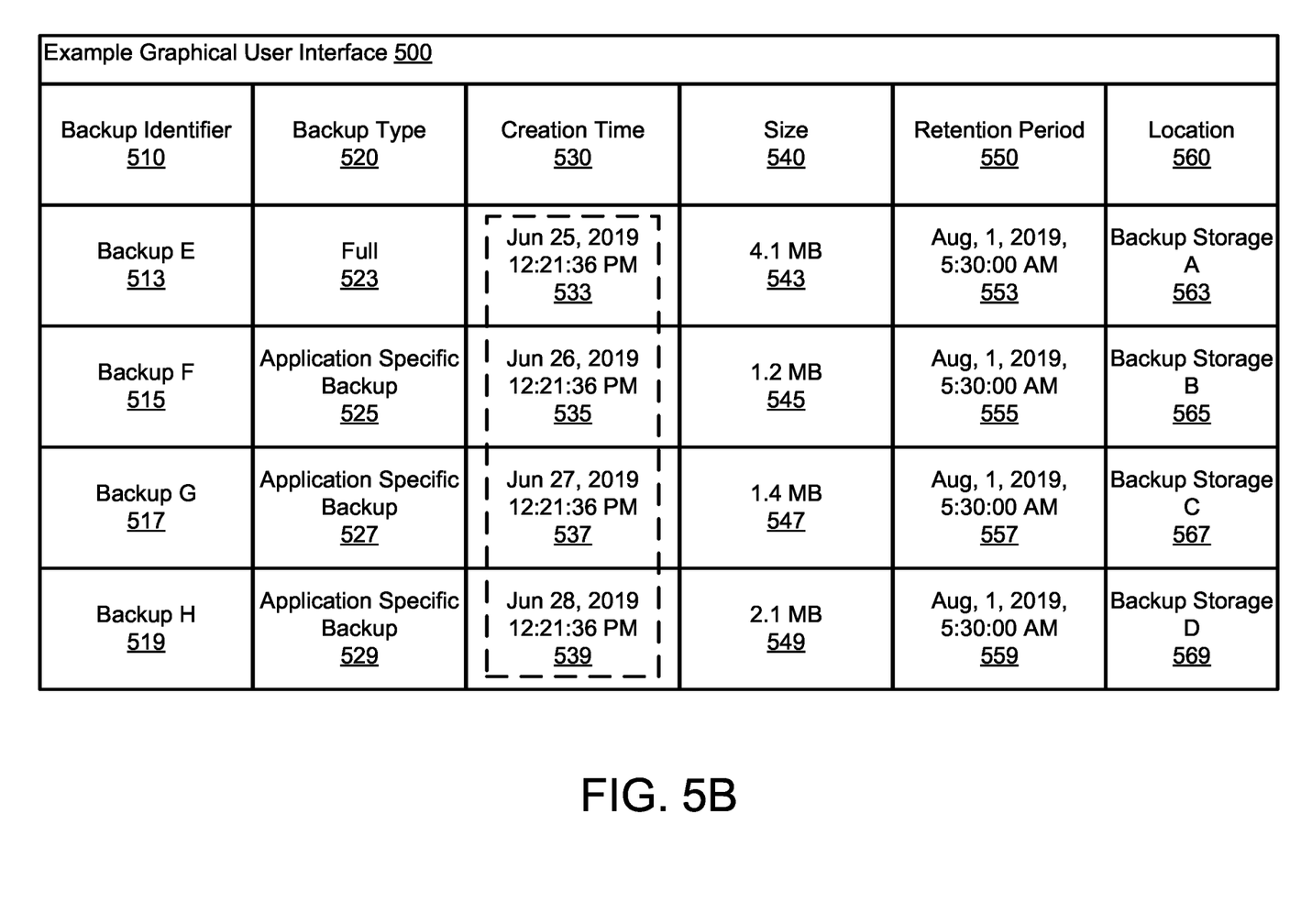

To further clarify aspects of embodiments of the invention, a non-limiting example is provided in FIGS. 5A-5B. FIGS. 5A-5B show example graphical user interfaces generated at different times. The example graphical user interfaces depicted in FIGS. 5A-5B may be similar to the graphical user interface depicted in FIG. 3.

Example

Consider a scenario as illustrated in FIG. 5A in which a manager (not shown) has been requested to analyze a protection policy. The protection policy to be analyzed has the requirement that after a full backup, three application specific backups should be generated every twenty-four hours following the full backup.

The manager used the backup data repository (not shown) to generate an example graphical user interface (500) to represent all of the full backups and the subsequent three application specific backups. For the sake of brevity, there is only one full backup (e.g., 512) and, therefore, only three application specific backups (e.g., 514, 516, and 518) stored in backup storages (not shown).

The example graphical user interface (500) includes both rows and columns of information pertaining to the backups associated with the protection policy. The first row includes descriptions of the information (e.g., 510, 520, 530, 540, 550, and 560) in the corresponding columns. The first row includes backup identifier (510), backup type (520), creation time (530), size (540), retention period (550), and location (560).

The rest of the rows pertain to backups and the columns pertain to a certain type of information regarding the backups. For example, the second row includes all of the information regarding backup A (512), and the first column contains all of the backup identifiers (510) of all of the backups associated with the protection policy.

The first backup represented in the graphical user interface is backup A (512). Backup A (512) is a full backup (522), was created on Jun. 20, 2019 at 12:21:36 PM (532), has a size of 4.1 MB (542), has a retention period of Aug. 1, 2019 at 5:30:00 AM (552) and is stored in backup storage A (562).

The second backup represented in the graphical user interface is backup B (514). Backup B (514) is an application specific backup (524), was created on Jun. 21, 2019 at 4:21:36 PM (534), has a size of 1.2 MB (544), has a retention period of Aug. 1, 2019 at 5:30:00 AM (554) and is stored in backup storage B (564).

The third backup represented in the graphical user interface is backup C (516). Backup C (516) is an application specific backup (526), was created on Jun. 22, 2019 at 8:21:36 PM (536), has a size of 1.4 MB (546), has a retention period of Aug. 1, 2019 at 5:30:00 AM (556) and is stored in backup storage C (566).

The fourth and final backup represented in the graphical user interface is backup D (518). Backup D (518) is an application specific backup (528), was created on Jun. 24, 2019 at 12:21:36 AM (538), has a size of 2.1 MB (548), has a retention period of Aug. 1, 2019 at 5:30:00 AM (558) and is stored in backup storage D (568).

As discussed above, the protection policy requires that three application specific backups should be generated every 24 hours after a full backup was generated. To meet the requirement of the protection policy, the creation time of each application specific backup should be 24 hours prior to the previous backup. To determine if the requirements, the creation time of the backups associated with the backups should be observed.

The example graphical user interface (500) includes a box with dashed lines over the creation times of the backups represented by the example graphical user interface (500). The creation time of backup A (512), the full backup (522), was created on Jun. 20, 2019 at 12:21:36 PM (532). In order to meet the requirements of the protection policy, the application specific backups, backup B (514), backup C (516), and backup D (518), should be created be created on 12:21:36 PM of Jun. 21, 2019, Jun. 22, 2019, and Jun. 23, 2019 respectively. However, as depicted by the dashed box in FIG. 5A, the creation times of the application specific backups are every 28 hours instead of the required 24 hours. There was a four-hour delay in the generation of the application specific backups. It is then determined by the backup analyzer of the manager or a user of the system that the protection policy requirement is not being met.

Based on this determination, the backup manager sends a message to the client associated with the protection policy, or an entity hosted by the client. The message includes a request to modify the backup generation to store three application specific backups every 24 hours after a full backup was generated in order to meet the requirements of the protection policy. In response to the request, the client generates and stores backups that meet the requirements of the protection policy.

FIG. 5B shows an example graphical user interface (500) at a future point in time compared to the point in depicted in FIG. 5A. The manager has been requested to analyze the same protection policy analyzed in FIG. 5A.

The manager used the backup data repository (not shown) to generate the example graphical user interface (500) to represent all of the full backups and the subsequent three application specific backups. For the sake of brevity, there is only one full backup (e.g., 513) and, therefore, only three application specific backups (e.g., 515, 517, and 519) stored in backup storages (not shown). These backups were generated after the backups depicted in the example graphical user interface (500) of FIG. 5A.

The example graphical user interface (500) includes both rows and columns of information pertaining to the backups associated with the protection policy. The first row includes descriptions of the information (e.g., 510, 520, 530, 540, 550, and 560) in the corresponding columns. The first row includes backup identifier (510), backup type (520), creation time (530), size (540), retention period (550), and location (560).

The rest of the rows pertain to backups and the columns pertain to a certain type of information regarding the backups. For example, the second row includes all of the information regarding backup E (e.g., 513), and the first column contains all of the backup identifiers (510) of all of the backups associated with the protection policy.

The first backup represented in the graphical user interface is backup E (513). Backup E (513) is a full backup (523), was created on Jun. 25, 2019 at 12:21:36 PM (533), has a size of 4.1 MB (543), has a retention period of Aug. 1, 2019 at 5:30:00 AM (553) and is stored in backup storage A (563).

The second backup represented in the graphical user interface is backup F (515). Backup F (515) is an application specific backup (525), was created on Jun. 26, 2019 at 12:21:36 PM (535), has a size of 1.2 MB (545), has a retention period of Aug. 1, 2019 at 5:30:00 AM (555) and is stored in backup storage B (565).

The third backup represented in the graphical user interface is backup G (517). Backup G (517) is an application specific backup (527), was created on Jun. 27, 2019 at 12:21:36 PM (537), has a size of 1.4 MB (547), has a retention period of Aug. 1, 2019 at 5:30:00 AM (557) and is stored in backup storage C (567).

The fourth and final backup represented in the graphical user interface is backup H (519). Backup H (519) is an application specific backup (529), was created on Jun. 28, 2019 at 12:21:36 PM (539), has a size of 2.1 MB (549), has a retention period of Aug. 1, 2019 at 5:30:00 AM (559) and is stored in backup storage D (569).

As discussed above, the protection policy requires that three application specific backups be generated every 24 hours after a full backup was generated. To determine if the requirements, the creation time of the backups associated with the backups should be observed.

The example graphical user interface (500) includes a box with dashed lines over the creation times of the backups represented by the example graphical user interface (500). The creation time of backup E (513), the full backup (523), was created on Jun. 25, 2019 at 12:21:36 PM (532). In order to meet the requirements of the protection policy, the application specific backups, backup F (515), backup G (517), and backup H (519), should be created on 12:21:36 PM of Jun. 26, 2019, Jun. 27, 2019, and Jun. 28, 2019 respectively. As depicted by the dashed box in FIG. 5B, the creation times of the application specific backups are every 24 hours as required by the protection policy.

Based on this observation, the backup analyzer of the manager, or a user of the system, determines that the requirements of the protection policy are being met. The backup manager does not modify the backup generation.

End of Example

Figure 6:
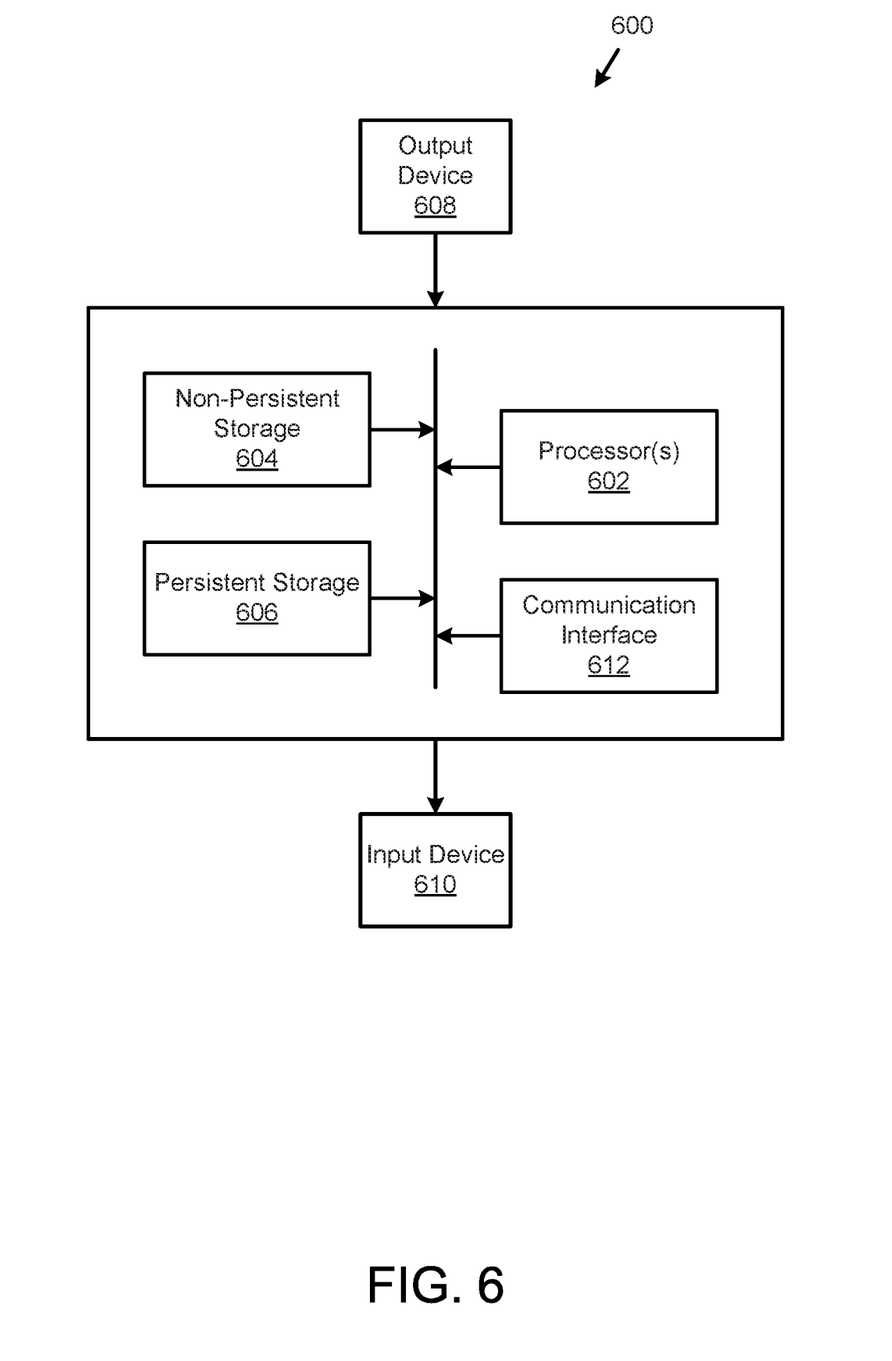
FIG. 6 shows a diagram of a computing device in accordance with one or more embodiments of the invention.

As discussed above, embodiments of the invention may be implemented using computing devices. FIG. 6 shows a diagram of a computing device in accordance with one or more embodiments of the invention. The computing device (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), input devices (610), output devices (608), and numerous other elements (not shown) and functionalities. Each of these components is described below.

In one embodiment of the invention, the computer processor(s) (602) may be an integrated circuit for processing instructions. For example, the computer processor(s) may be one or more cores or micro-cores of a processor. The computing device (600) may also include one or more input devices (610), such as a touchscreen, keyboard, mouse, microphone, touchpad, electronic pen, or any other type of input device. Further, the communication interface (612) may include an integrated circuit for connecting the computing device (600) to a network (not shown) (e.g., a local area network (LAN), a wide area network (WAN) such as the Internet, mobile network, or any other type of network) and/or to another device, such as another computing device.

In one embodiment of the invention, the computing device (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing devices exist, and the aforementioned input and output device(s) may take other forms.

Embodiments of the invention may provide a method for providing backup and/or restoration services in a manner that is consistent with protection policies. Because workflows for providing backup and/or restoration services may not meet protection policies, embodiments of the invention may provide a method of generating a graphical user interface based on previously generated backups to ascertain whether protection policies will be met in the future. For example, a system in accordance with embodiments of the invention may analyze backups to identify inter-dependencies between the generated backups and generate a display to enable the inter-dependencies to be visualized. The displayed inter-dependencies may be utilized to ascertain whether a current workflow for providing backup and/or restoration services is likely to result in backups that provide a scope of protection that meets the requirements of corresponding protection policies. Because inter-dependencies are not evident from the backups in isolation, embodiments of the invention may provide a method for ascertaining whether appropriate protection is being provided in a manner that decreases the cognitive burden on a user of a system.

Thus, embodiments of the invention may address the problem of cognitive limitations of users of distributed system.

The problems discussed above should be understood as being examples of problems solved by embodiments of the invention of the invention and the invention should not be limited to solving the same/similar problems. The disclosed invention is broadly applicable to address a range of problems beyond those discussed herein.

One or more embodiments of the invention may be implemented using instructions executed by one or more processors of the data management device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for providing backup services, comprising:
identifying a new backup stored in backup storage;
generating backup information associated with the identified new backup;
updating a backup data repository based on the backup information to obtain an updated backup data repository;
obtaining a request to analyze a protection policy of the protection policies; and
in response to obtaining the request:
generating a graphical user interface using the updated backup data repository that includes a representation of all backups stored in the backup storage that are associated with the protection policy, wherein:
the graphical user interface comprises a plurality of rows; and
each row of the plurality of rows comprises a portion of information associated with a backup of the backups comprising a backup type, a creation time, a backup size, a retention period, and a storage location;
providing the graphical user interface to a user;
obtaining a user indication associated with the graphical user interface;
making a determination that the user indication specifies that at least one row of the plurality of rows indicates that requirements of the protection policy are not met, wherein the requirements of the protection policy specify:
a required backup type,
a required creation time,
a required retention period, and
a required storage location; and
in response to the determination that the user indication specifies that at least one row of the plurality of rows indicates that a requirement of the protection policy is not met:
modifying a backup schedule associated with the protection policy based on the user indication associated with the graphical user interface to meet the requirements of the protection policy, wherein modifying the backup schedule comprises:
scheduling generation of a second new backup associated with the required backup type, the required creation time, the required retention period, and the required storage location.

2. The method of claim 1, wherein the new backup was generated using native backup functionality of a client.

3. The method of claim 2, wherein the native backup functionality is provided by an application hosted by the client.

4. The method of claim 3, wherein the new backup is usable for restoring the application, wherein the new backup is unusable for restoring other applications.

5. The method of claim 1, wherein the backups comprise:
the new backup; and
a previous backup associated with all data of a client, wherein the new backup is associated with a portion of the data of the client.

6. A non-transitory computer readable medium comprising computer readable program code, which when executed by a computer processor enables the computer processor to perform a method of providing backup services, the method comprising:
identifying a new backup stored in backup storage;
generating backup information associated with the identified new backup;
updating a backup data repository based on the backup information to obtain an updated backup data repository;
obtaining a request to analyze a protection policy of the protection policies; and
in response to obtaining the request:
generating a graphical user interface using the updated backup data repository that includes a representation of all backups stored in the backup storage that are associated with the protection policy, wherein:
the graphical user interface comprises a plurality of rows; and
each row of the plurality of rows comprises a portion of information associated with a backup of the backups comprising a backup type, a creation time, a backup size, a retention period, and a storage location;
providing the graphical user interface to a user;
obtaining a user indication associated with the graphical user interface;
making a determination that the user indication specifies that at least one row of the plurality of rows indicates that requirements of the protection policy are not met, wherein the requirements of the protection policy specify:
a required backup type,
a required creation time,
a required retention period, and
a required storage location; and
in response to the determination that the user indication specifies that at least one row of the plurality of rows indicates that a requirement of the protection policy is not met:
modifying a backup schedule associated with the protection policy based on the user indication associated with the graphical user interface to meet the requirements of the protection policy, wherein modifying the backup schedule comprises:
scheduling generation of a second new backup associated with the required backup type, the required creation time, the required retention period, and the required storage location.

7. The non-transitory computer readable medium of claim 6, wherein the new backup was generated using native backup functionality of a client.

8. The non-transitory computer readable medium of claim 7, wherein the native backup functionality is provided by an application hosted by the client.

9. The non-transitory computer readable medium of claim 8, wherein the new backup is usable for restoring the application, wherein the new backup is unusable for restoring other applications.

10. The non-transitory computer readable medium of claim 6, wherein the backups comprise:
the new backup; and
a previous backup associated with all data of a client, wherein the new backup is associated with a portion of the data of the client.

11. A backup manager for managing backup services, comprising:
   persistent storage for storing:
      a backup data repository and protection policies; and
   a backup analyzer programmed to:
      identify a new backup stored in backup storage;
      generate backup information associated with the identified new backup;
      update the backup data repository based on the backup information to obtain an updated backup data repository;
      obtain a request to analyze a protection policy of the protection policies; and
      in response to obtaining the request:
         generate a graphical user interface using the updated backup data repository that includes a representation of all backups stored in the backup storage that are associated with the protection policy, wherein:
            the graphical user interface comprises a plurality of rows; and
            each row of the plurality of rows comprises a portion of information associated with a backup of the backups comprising a backup type, a creation time, a backup size, a retention period, and a storage location;
         provide the graphical user interface to a user;
         obtain a user indication associated with the graphical user interface;
         make a determination that the user indication specifies that at least one row of the plurality of rows indicates that requirements of the protection policy are not met, wherein the requirements of the protection policy specify:
            a required backup type,
            a required creation time,
            a required retention period, and
            a required storage location; and
         in response to the determination that the user indication specifies that at least one row of the plurality of rows indicates that a requirement of the protection policy is not met:
            modify a backup schedule associated with the protection policy based on the user indication associated with the graphical user interface to meet the requirements of the protection policy, wherein modifying the backup schedule comprises:
               scheduling generation of a second new backup associated with the required backup type, the required creation time, the required retention period, and the required storage location.

12. The backup manager of claim 11, wherein the new backup was generated using native backup functionality of a client.

13. The backup manager of claim 12, wherein the native backup functionality is provided by an application hosted by the client.

14. The backup manager of claim 13, wherein the new backup is usable for restoring the application, wherein the new backup is unusable for restoring other applications.

15. The backup manager of claim 11, wherein the backups comprise:
   the new backup; and
   a previous backup associated with all data of a client,
   wherein the new backup is associated with a portion of the data of the client.

* * * * *